(No Model.)
A. T. CONDON.
TRICYCLE.
No. 564,408.  Patented July 21, 1896.
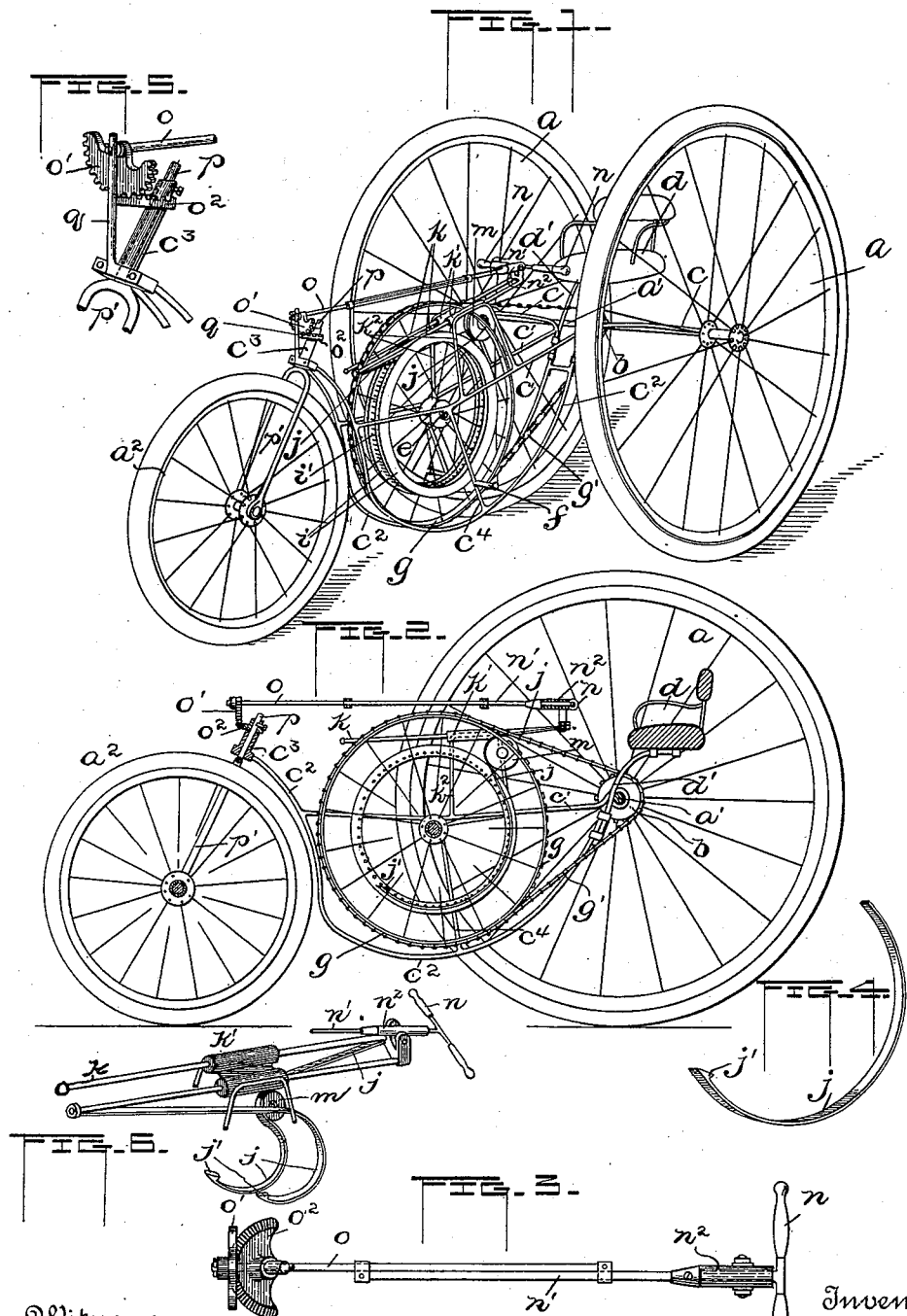
Witnesses
O. W. Smith
F. P. Davis
Inventor
Albin T. Condon
By Wright, Brown & Quinby
Attorneys

UNITED STATES PATENT OFFICE.

ALVIN T. CONDON, OF BELFAST, MAINE.

TRICYCLE.

SPECIFICATION forming part of Letters Patent No. 564,408, dated July 21, 1896.

Application filed August 20, 1895. Serial No. 559,914. (No model.)

*To all whom it may concern:*

Be it known that I, ALVIN T. CONDON, of Belfast, in the county of Waldo and State of Maine, have invented certain new and useful Improvements in Tricycles, of which the following is a specification.

This invention relates to propulsion and steering of polycycles, and more particularly tricycles, and has in view to provide improved means of propulsion whereby increased speed is obtained by muscular exertion expended in much the same way as in rowing a boat, and, further, to provide for steering by the same handle as used for propelling.

To the above ends the invention consists in certain novel features of construction and combinations of parts recited in the appended claims.

The drawings which accompany and form part of this specification illustrate an embodiment of the invention.

Figure 1 shows a perspective view of the machine. Fig. 2 shows a longitudinal central section of the same. Fig. 3 shows a top plan view, on an enlarged scale, of the steering and propelling handle. Fig. 4 shows a perspective view of a certain spring-pawl. Fig. 5 shows a perspective view of the steering-gear. Fig. 6 shows a perspective view of part of the driving-gear.

The letter $a$ designates the main wheels of a tricycle, which are mounted on a common axle $a'$, carrying a small sprocket-wheel $b$, and $a^2$ designates the front wheel.

The frame of the machine is made up as follows: Rods $c$ are fastened to the axle-bearings and extend inward toward each other, and from them spring the forward-extending rods $c'$ and downward-curved rods $c^2$, which again join the rods $c'$ at the front part of the machine, and thence extend upwardly to a steering-head $c^3$. A seat $d$ is supported by arms $d'$, which rise from the rear ends of the rods $c^2$, said arms curving somewhat back to bring the seat over the axle. At the middle of the frame vertical rods $c^4$ connect the rods $c'$ and $c^2$ and constitute braces and also afford support for bearings $e$ and, moreover, for foot-rests $f$, projecting on each side. The bearings $e$ receive the journals of a sprocket-wheel $g$, which is connected by a chain $g'$ with the sprocket-wheel $b$ on the axle. The relative sizes of these sprockets is such as to greatly multiply the revolutions of the sprocket $b$ as compared with the sprocket $g$, and thereby increase speed.

A device somewhat in the nature of a ratchet-wheel is compounded with the sprocket $g$, said device being made up of a number of annular disks $i$, two being placed on each side of the sprocket and all being joined together by pins $i'$, which serve as teeth, as will hereinafter appear. The annular disks are held apart so as to provide sufficient space between them for pawls to work, and they project beyond the pins $i'$ far enough to prevent lateral shifting of the pawls out of engagement with the teeth or pins. The toothed wheel or wheels made up of these annular disks and connecting-pins are rigidly fastened to the spokes of the sprocket-wheel, so that all these parts operate together as one piece. Pawls in the form of thin straps or bands of steel $j$ are arranged to coact with the toothed wheels, each band or strap being tempered in curved form, so as to closely hug its section of the toothed wheel, and being formed at one end with a dog $j'$ to engage the pins $i'$. The straps are connected with a slide which works tangentially of the wheel, and is composed of two rods $k$, which slide through sleeves $k'$, fastened on brackets $k^2$, rising from the rods $c'$ of the frame. In order to maintain a continuous driving force on the wheel, the straps are arranged to operate alternately, and to this end are connected with opposite ends of the slide, one strap being connected with the outer end of one of the rods $k$, while the other strap is connected with the inner end of the other rod. This latter strap is carried over a pulley $m$, so as to hold it up to the wheel.

It will now be seen that with the arrangement above described reciprocations of the slide will cause the strap to act alternately on the wheel, i. e., while one strap is driving the wheel the other is slipping around to get a new hold.

The slide is reciprocated by means of handles $n$ on a bar which has a stem $n'$ extending through a sleeve $n^2$, pivoted between ears on the slide. Said handle is held from longitudinal movement in said sleeve, but may turn therein. The stem $n'$ constitutes one member of an extensible rod, the other member, $o$, of which carries at its forward end a segment $o'$ in mesh with a crown-segment $o^2$ on the stem $p$ of the front fork $p'$. Thus the same handle used for propelling the machine serves for steering it. The forward end of the extensible rod is supported by a suitable bracket or arm $q$, rising from the base of the steering-head.

It will be seen that the motion in propelling the machine is similar to the motion in rowing a boat, the occupant seating himself on the seat $d$ and grasping the handles $n$ and moving them forward and back.

Having thus explained the nature of my invention and described a way of constructing and using the same, though without attempting to set forth all of the forms in which it may be made or all of the modes of its use, what I claim, and desire to secure by Letters Patent, is—

1. Driving mechanism for polycycles comprising a double-toothed wheel, an elongated operating-slide arranged to reciprocate tangentially of said wheel, and a pair of flexible straps fastened to opposite ends of said slide and winding about the toothed wheel in the same direction, said straps having catches to engage the teeth of the latter, reciprocations of said slide causing the straps to alternately actuate the wheel, substantially as described.

2. Driving mechanism for polycycles comprising a double-toothed wheel, an elongated operating-slide arranged to reciprocate tangentially of said wheel, a pair of flexible straps fastened to opposite ends of the said slide and winding in the same direction about the said wheel said straps having catches to engage the teeth of the latter, and a guide-roller holding one of said straps up to the wheel, substantially as and for the purpose described.

3. In a polycycle, the combination of a propelling-slide, a handle journaled in a bearing on the slide and held from longitudinal movement therein, and steering-gear operatively connected with said handle with provision for longitudinal play of the handle substantially as described.

4. In a polycycle, the combination of a propelling-slide, a handle having a swiveled connection therewith, an extensible rod connected with the said handle so as to turn therewith, a segment on said rod, and a gear on the stem of the front fork in mesh with said segment, substantially as and for the purpose described.

In testimony whereof I have signed my name to this specification, in the presence of two subscribing witnesses, this 10th day of August, A. D. 1895.

ALVIN T. CONDON.

Witnesses:
ORAMEL E. HANEY,
CHESTER B. PATTERSON.